Figure 1:
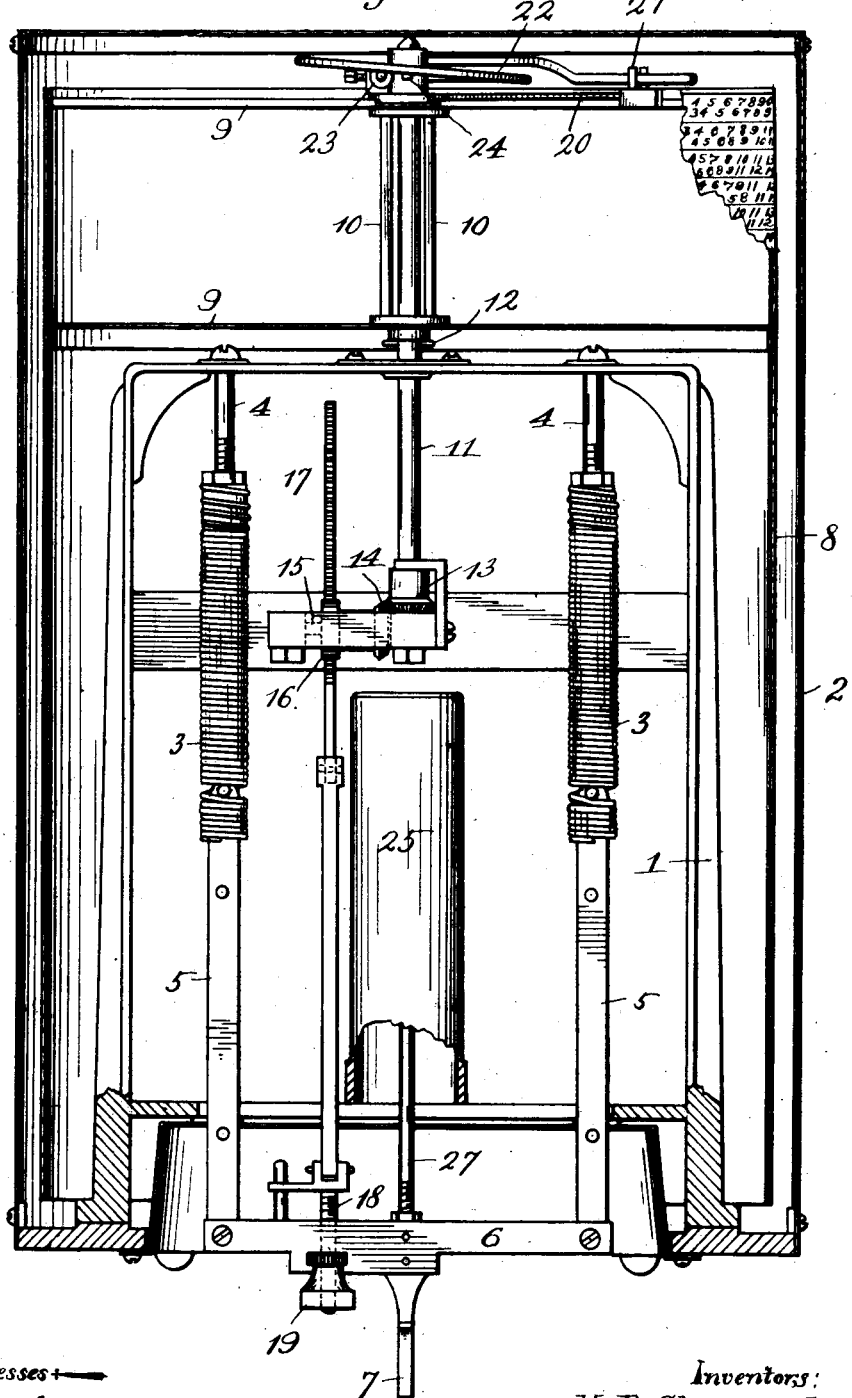

No. 866,690. PATENTED SEPT. 24, 1907.
H. B. SHERWOOD & O. B. BLANKENSHIP.
COMPUTING SCALE.
APPLICATION FILED FEB. 7, 1907.

2 SHEETS—SHEET 1.

Witnesses:
E. Seidelman.
R. E. Hamilton.

Inventors:
H. B. Sherwood
and O. B. Blankenship
By F. G. Fischer Atty.

THE NORRIS PETERS CO., WASHINGTON, D. C.

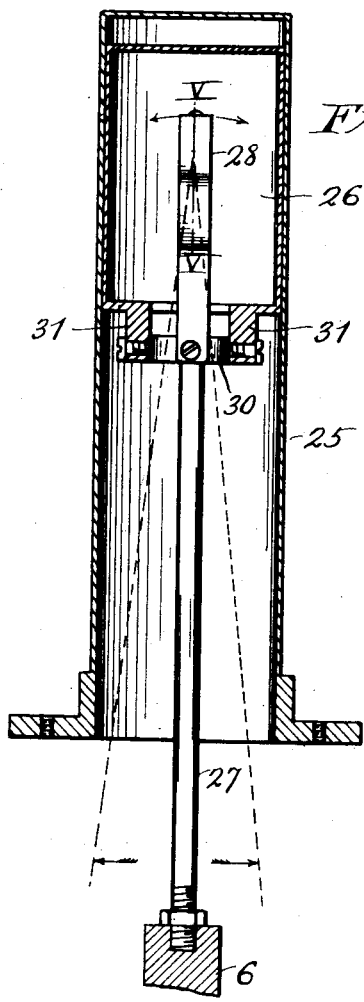
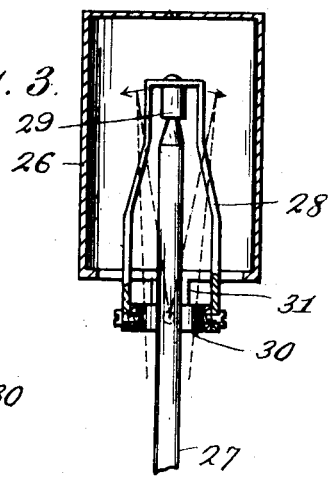
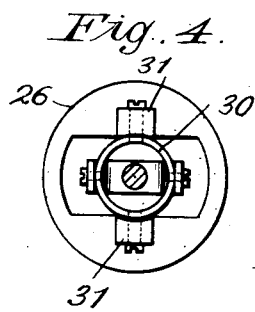
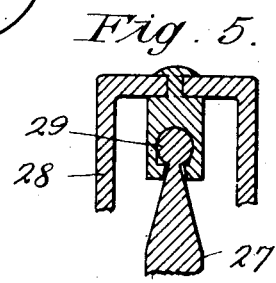
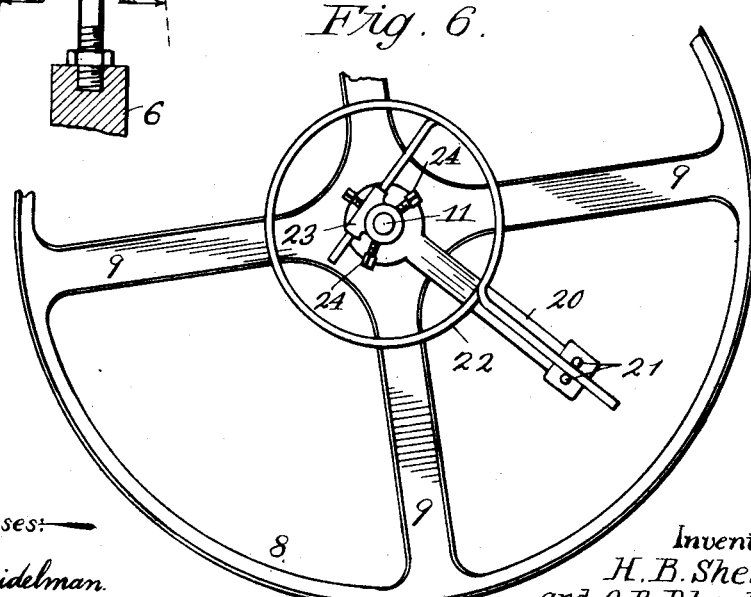

UNITED STATES PATENT OFFICE.

HARRY B. SHERWOOD AND ORAN B. BLANKENSHIP, OF KANSAS CITY, MISSOURI.

COMPUTING-SCALE.

No. 866,690.　　　Specification of Letters Patent.　　　Patented Sept. 24, 1907.

Application filed February 7, 1907. Serial No. 356,205.

*To all whom it may concern:*

Be it known that we, HARRY B. SHERWOOD and ORAN B. BLANKENSHIP, citizens of the United States, residing at Kansas City, in the county of Jackson and State of Missouri, have invented certain new and useful Improvements in Computing-Scales, of which the following is a specification.

Our invention relates to improvements in computing scales; and our object is to provide means for quickly bringing the graduated cylinder and the pan of the scale to rest, so that the weight and price of merchandise being weighed may be easily read upon said cylinder.

An air-cushion consisting of a cylinder and a piston are generally employed to bring the graduated cylinder to rest, but the piston-rod connecting the piston-head to the pan is so short that its movements materially interfere with the proper operation of the piston-head. We provide connections between the piston-head and its rod, whereby the length of the latter is greatly increased, so that it will not swing far out of alinement with the piston-head and, consequently, will not retard the movements of the latter.

Referring now to the accompanying drawings which illustrate the invention:—Figure 1 represents a vertical section of a computing scale with the pan or platform removed. Fig. 2 is an enlarged central section of the air-cushion provided with our invention. Fig. 3 is a central vertical section of the piston provided with our invention. Fig. 4 is an inverted plan view of the same. Fig. 5 is an enlarged vertical section on line V—V of Fig. 2. Fig. 6 is a broken plan view of the graduated cylinder and means whereby it is resiliently connected to its shaft.

In said drawings, 1 designates a frame inclosed in a stationary drum 2.

3 designates a pair of balance springs suspended from the frame by a pair of screws 4, and secured at their lower ends to a pair of connecting-bars 5. Said connecting-bars are pivotally secured at their lower ends to an equalizing-bar 6 provided with a depending hook 7, from which the pan (not shown) is suspended, or to which the platform is connected if the device be applied to a platform scale.

8 designates the graduated cylinder which is inclosed within the drum and provided with spokes 9 connected by a hub 10, loosely mounted upon the upper portion of a shaft 11 and resting upon a pin 12 extending through said shaft. When springs 3 are expanded by merchandise upon the scale, shaft 11 is rotated and rocked until the scale comes to rest by a train of gearing, comprising a bevel wheel 13, fixed to the lower end of the shaft, a bevel wheel 14 loosely mounted upon a transverse pin 15 and intermeshing with bevel wheel 13, a pinion 16 connected to bevel wheel 14, and a connecting-bar 17 which drives the pinion and is connected at its lower end to a screw 18, extending through a thumb-nut 19 carried by the equalizing-bar 6. All of the above mechanism is old and forms no part of the present invention.

20 designates an arm fixed to the upper end of hub 10, and provided at its outer terminal with a pair of studs 21.

22 designates a spring for yieldingly connecting the graduated cylinder to shaft 11, so that when the latter is suddenly operated by throwing merchandise upon the pan or platform the shock incident thereto will not be communicated to said cylinder, but will be absorbed by the spring.

The outer end of spring 22 extends between the studs 21, while its inner end extends through a clip 23 secured to the upper end of shaft 11 by two set-screws 24.

Shaft 11 is brought to rest by an air-cushion consisting of a cylinder 25, a piston-head 26, and a piston-rod 27 the lower end of which is connected to the equalizing-bar 6. The upper end of the piston-rod is connected to a yoke 28 by a ball-and-socket joint 29, so that the lower end of said piston-rod will be free to swing in any direction with the equalizing-bar. Yoke 28 is pivotally connected at its lower end to a ring 30, which latter is pivotally connected to a pair of lugs 31 depending from the lower end of the piston-head 26, so that the upper end of the piston-rod and the yoke will be free to swing in any direction. By thus extending the piston-rod upwardly into the piston-head and loosely connecting the same through the medium of the intervening parts, it is obvious that the movements of the equalizing-bar, occasioned by the swinging of the pan, will not materially throw the piston-rod out of alinement with the piston-head, and, consequently, the upward movement of said piston-head will not be retarded as it would if the piston-rod were short, it being obvious that the movement of said piston-head will be retarded in proportion to the angle at which the piston-rod pushes thereon.

Having thus described our invention, what we claim is:—

1. In a computing scale having an air-cushion consisting of a cylinder and piston-head, the combination of a swinging member extending into said piston-head and having a loose connection therewith, and a piston-rod loosely connected to the inner end of said member and connected to a movable part of the scale.

2. In a computing scale, having an air-cushion consisting of a cylinder and piston-head, the combination of a yoke extending into said piston-head and having a loose connection therewith, and a piston-rod connected to the inner end of said yoke and connected to a movable part of the scale.

3. In a computing scale having an air-cushion consisting of a cylinder and piston-head, the combination of a ring pivotally secured to one end of the piston-head, a member pivotally secured to the ring and extending into the piston-head, and a piston-rod loosely connected to the inner end of said member and connected to a movable part of the scale.

4. In a computing scale having a graduated cylinder, an equalizing-bar, gearing connecting the equalizing bar and the graduated cylinder, and an air-cushion consisting of a cylinder and a piston-head, the combination of a member extending into said piston-head and having a loose connection therewith, and a piston-rod having a ball-and-socket connection to the inner end of said member and connected to a movable part of the scale.

In testimony whereof we affix our signatures in the presence of two witnesses.

HARRY B. SHERWOOD.
ORAN B. BLANKENSHIP.

Witnesses:
F. G. FISCHER,
M. COX.